United States Patent [19]
Hanemaayer

[11] Patent Number: 5,458,353
[45] Date of Patent: Oct. 17, 1995

[54] RUNNING BOARD STORAGE COMPARTMENT FOR RECREATIONAL VEHICLE

[76] Inventor: Jacobus N. Hanemaayer, 100 Shirley Avenue, Kitchener, Ontario, Canada, N2B 2E1

[21] Appl. No.: 97,659

[22] Filed: Jul. 26, 1993

[30] Foreign Application Priority Data

Nov. 30, 1992 [CA] Canada ................................. 2084160
May 19, 1993 [CA] Canada ................................. 2096602

[51] Int. Cl.⁶ .................................................. B60R 3/00
[52] U.S. Cl. .................. 280/164.1; 296/371; 296/37.14
[58] Field of Search .......................... 280/164.1, 163; 296/37.1, 37.2, 37.6, 37.14

[56] References Cited

U.S. PATENT DOCUMENTS

| | | | |
|---|---|---|---|
| 1,453,362 | 5/1923 | Loveland | 280/164.1 |
| 1,497,670 | 6/1924 | Casselette | 280/164.1 |
| 1,724,667 | 8/1929 | Krimstein | 280/164.1 |
| 1,784,971 | 12/1930 | Moore | 280/164.1 |
| 2,572,774 | 10/1951 | Smith et al. | 296/37.6 |
| 2,981,554 | 4/1961 | Mulcher et al. | 280/164.1 |
| 5,022,679 | 5/1991 | Pazik | 280/164.1 |

FOREIGN PATENT DOCUMENTS 1200262  2/1986  Canada.

OTHER PUBLICATIONS

Prior use in U.S. of more than one year—J. Hanemaayer, Sketch of running board storage area.

Primary Examiner—Richard M. Camby
Attorney, Agent, or Firm—Killworth, Gottman, Hagan & Schaeff

[57] ABSTRACT

A recreational vehicle is provided with a storage compartment which makes use of the space in the region of the curved running board of the vehicle and combines it with the space under the floor of the vehicle and running along one side of it thus making a relatively large storage space which is sealed from the elements and to which access is provided through one or more doors provided directly in the running board or in the lower portion of the vehicle body side wall directly thereabove, or in both, depending on the circumstances.

16 Claims, 9 Drawing Sheets

RUNNING BOARD STORAGE COMPARTMENT FOR RECREATIONAL VEHICLE

BACKGROUND OF THE INVENTION

This invention relates to improvements in storage compartments for use in recreational vehicles, There are many types of recreational vehicles and the present invention is particularly applicable to camper van conversions which involve the conversion of a commercial cargo van, These camper van conversions are officially known in the industry as Class B recreational vehicles, Various cargo van body lengths, e.g. short, standard and extended body lengths are provided by several of the automotive manufacturers such as General Motors, Ford and Chrysler, In the process of converting the cargo van, portions of the floor are lowered or "dropped" and all or a substantial portion of the roof may be raised thereby to provide additional head room, The van is typically provided with an interior layout designed to make the best use of the limited space available as shown for example in my earlier Canadian Patent No, 1,200,262 issued Feb. 4, 1986, Regardless of the degree of effort made to conserve space in these types of recreational vehicles, the provision of adequate storage space always poses a problem, There seldom seems to be sufficient storage space particularly for larger outdoor items such as lawn chairs and if these have to be placed inside the van in places where they are not intended, the result is a cluttered and untidy van interior, For years, recreational vehicles of the type under consideration have been provided with running boards which extend along both sides of the body between the wheels at the lower extremity of the body, In the past, these running boards were flat from one end to another with nothing beneath them, Other than acting as a step and hence providing for ease of entering the van, they tended to have an attractive appearance and helped to cover from view anything unattractive underneath the van. However, certain cargo van manufacturers have in the recent past re-designed the running boards such that the sides tops of these pseudo running boards are curved or slanted, except at the doors, to provide a so-called "ground effect" and to blend in better with the curved exterior of the van. Thus, the term "running board", as used hereafter is intended to refer to this redesigned form of running board as opposed to the more traditional form of flat running board which acts as a step. Some of these running boards have hinged sections in them to provide easier service access such as for the filling of liquid propane gas or the discharging of sewer tanks etc. while at the same time they still have nothing under them which would serve to provide a closed storage compartment.

For years, we have been using the space under the floor of the van, that runs next to the running board and over to the chassis rail, for a semi-closed in type of storage with a door opening cut in the body below floor level and through the so-called rocker panel which is a few inches in from the exterior skin and converges toward it at the bottom. This storage area is partially exposed to the dusty and sometimes wet elements and hence items that had to be kept clean and dry could not be stored there.

SUMMARY OF THE INVENTION

The present invention helps to overcome the problems associated with the prior art arrangements noted above and provides a storage compartment which makes use of the space in the region of the curved running board (as defined above) and combines it with the space under the floor of the van running along one side of it thus making a relatively large storage space which is sealed from the elements and to which access is provided through one or more doors provided directly in the running board or in the lower portion of the van body side wall directly thereabove, or in both, depending on the circumstances.

Thus according to the invention in one aspect there is provided a recreational vehicle including a van body having a side wall, a floor, and a running board at the lower extremity of the van body and extending downwardly below said side wall; a storage compartment extending inwardly from said running board and having a bottom wall extending inwardly of the vehicle body away from said running board and joined to an upwardly extending compartment back wall, said back wall extending upwardly toward the floor of the vehicle body, front end and rear end walls defining the fore and aft extremities of said compartment, and at least one doorway opening leading into said compartment from the exterior of the van body, and a door for selectively opening or closing said at least one doorway opening.

In one form of the invention said bottom wall extends inwardly at a level corresponding generally to the lower extremity of said running board.

In a typical embodiment of the invention said running board extends downwardly and outwardly relative to the van body.

In one embodiment the compartment bottom, back front and rear walls are of a composite material formed as a one-piece structure.

In a further embodiment of the invention said floor comprises a normal level floor which extends outwardly toward the side wall of the van body such that said compartment extends from said bottom wall upwardly to said normal level floor and said compartment is a unitary compartment extending from said bottom wall to the normal level floor.

In a still further embodiment of the invention said van body floor extends outwardly to the side wall of the van body with said compartment extending from the bottom wall upwardly to said floor, and said compartment being void of any interior shelf to allow large objects to be placed in said compartment.

In a further form of the invention said van body floor extends outwardly to the side wall of the van body with said compartment extending from the bottom wall upwardly to said floor, and a shelf within said compartment movable from a first horizontal position spaced from the bottom wall and extending from said back wall toward said doorway opening to a second collapsed position in close juxtaposition to said back wall and said bottom wall of the compartment.

In an alternative embodiment of the invention said shelf extends the full length of said compartment and ledges fixed to said front end and rear end walls of the compartment for supporting the shelf in the horizontal position, said shelf having longitudinal hinges and being foldable longitudinally for movement into the collapsed position.

In a still further aspect of the invention said shelf is in three parts with the frontal part adjacent the doorway opening being foldable upwardly or downwardly and being lockable in place at right angles to the rest of the shelf to provide rigidity to the frontal portion of the shelf.

Further features and advantages of the invention will be apparent from the detailed description of preferred embodiments of same which follow hereafter.

DETAILED DESCRIPTION OF THE PREFERRED EMBODIMENTS

Figure 1:
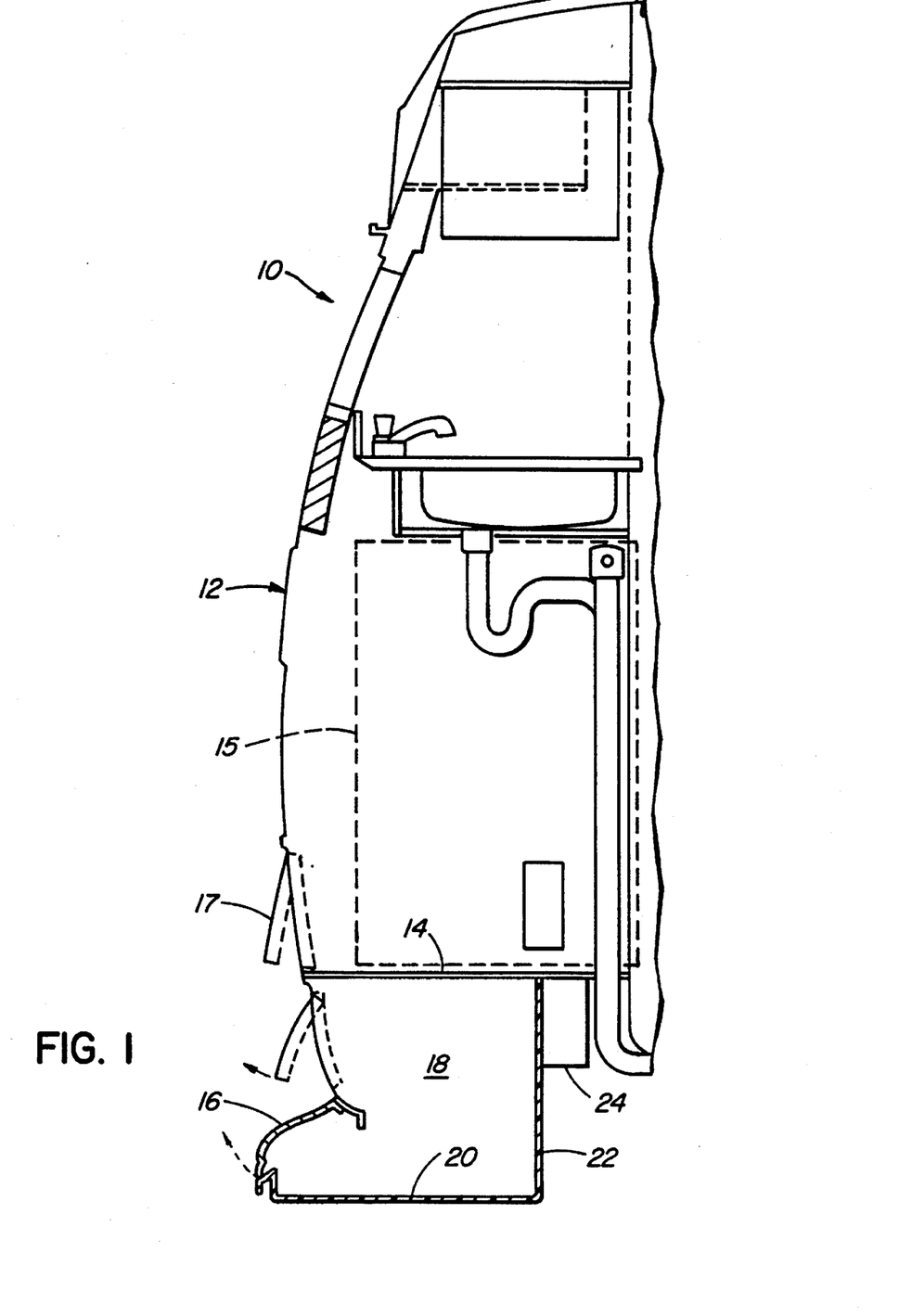
FIG. 1 is a partial transverse sectional view through the body of a recreational vehicle illustrating a storage compartment at the lower extremity thereof in accordance with the principles of the present invention.
Figure 2:
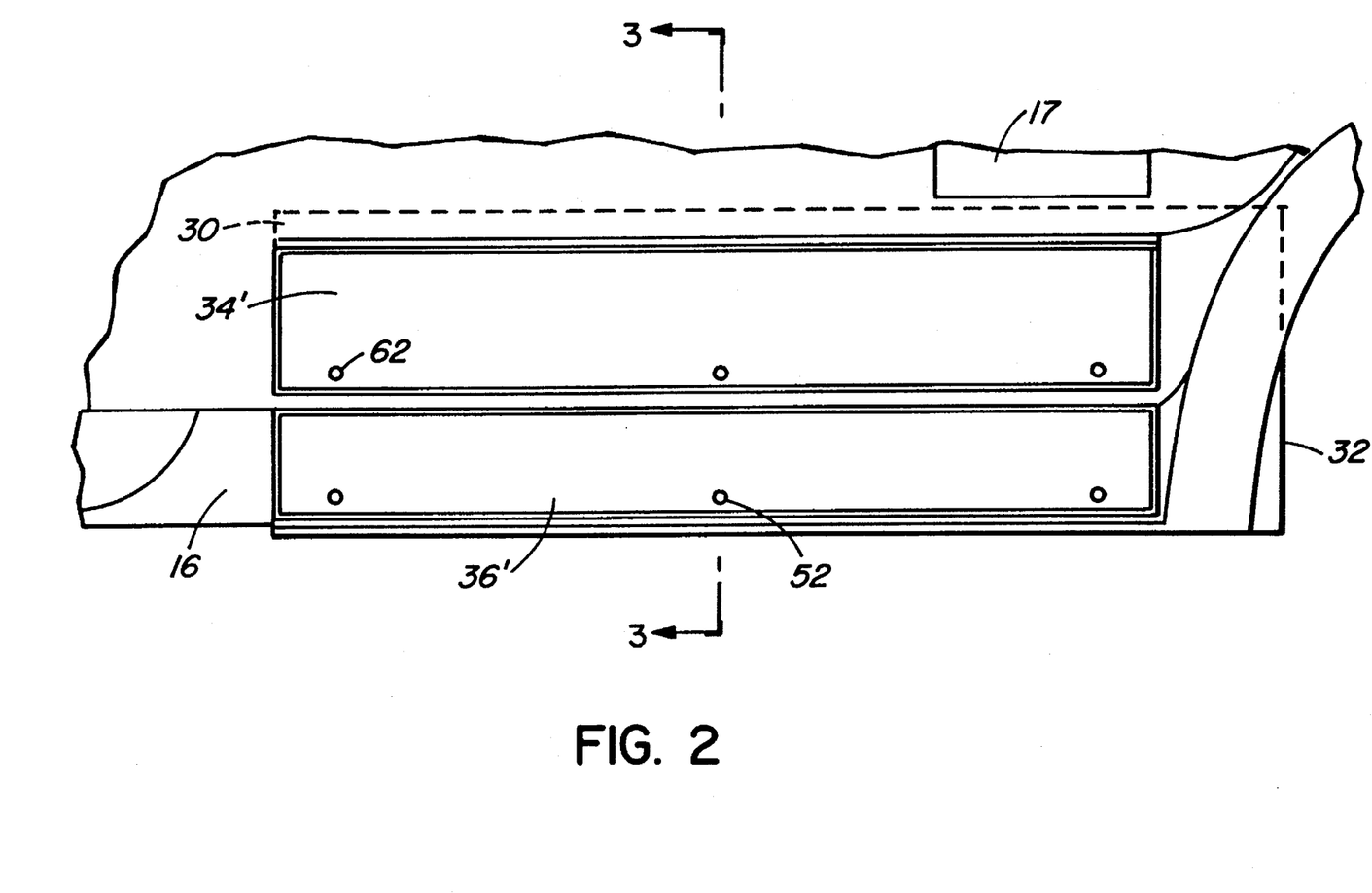
FIG. 2 is an elevation view of the storage compartment and its immediate environment as seen from the exterior of the recreational vehicle.

Referring firstly to FIGS. 1 and 2 there is shown a portion of a recreational vehicle 10 including a modified van body having a side wall 12, a floor 14 shown as supporting a refrigerator 15 with the side wall having a grill-vented refrigerator service door 17. A so called running board 16 as defined in the "background" portion of the specification extends downwardly from a lower portion of the sidewall. A storage compartment 18 extends inwardly from the running board 16 and it includes a bottom wall 20 joined to a lower edge portion of the running board and extending inwardly of the vehicle body. This flat bottom wall 20 is joined to an upwardly extending back wall 22, which back wall extends upwardly toward a rectangular chassis rail 24 which, in turn, is secured to the floor 14. The various components noted may be of suitable composite materials such as fibre reinforced plastics while in other cases the components may be of steel joined together by welding or other suitable means.

Figure 3:
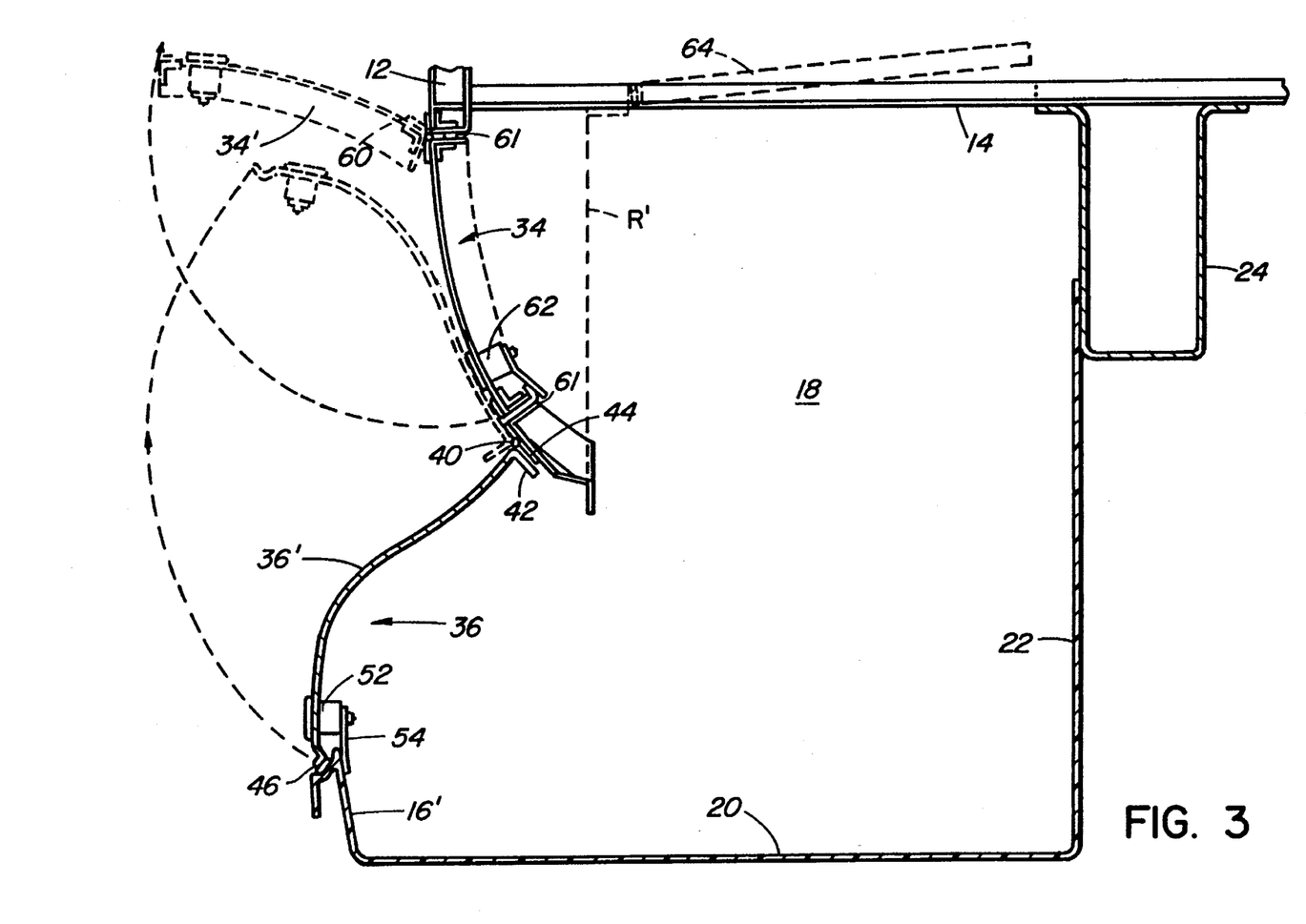
FIG. 3 is a transverse cross-sectional view of the storage compartment taken along section line 3—3 of FIG. 2 and illustrating one particular form of storage compartment arrangement.

The compartment 18 described generally with reference to FIG. 1 is shown in greater detail in FIGS. 2 and 3. It will be noted that the flat bottom wall 20 is integrally formed with back wall 22 from glass fibre matting impregnated with thermosetting plastic resin. The upper extremity of the back wall 22 is overlapped with and securely bonded or otherwise suitably secured to the outer side of chassis rail 24. The compartment 18 is also provided with a frontal wall 30 and a rear wall 32 (see FIG. 2) also of the same composite material, the outline shapes of these frontal and rear walls corresponding to the cross-sectional shape of the compartment 18 as seen in FIG. 3 with these walls together with the rest of the one-piece compartment structure substantially preventing ingress of moisture and dust into the compartment 18 when travelling. The position of the rocker panel, which has been cut away to allow access to the compartment 18 via doorway 34 is shown by the dashed lines R'.

As illustrated in FIGS. 2 and 3, the compartment 18 is provided with a pair of lengthwise extending doorway openings 34 and 36. The lower doorway opening 36 is provided in the running board 16 and extends almost the full length thereof, such doorway opening 36 having a door 36' associated therewith for selectively opening or closing the doorway opening. The upper doorway opening 34 is provided in the lowermost portion of the body side wall 12 and this elongated doorway opening is provided with a correspondingly shaped door 34' for selectively opening and closing the same.

The lower door 36' in the running board 16 is of course contoured as illustrated to match the contour of the running board so that when this door is closed the two match perfectly with each other and provide a pleasing exterior appearance. The upper edge of door 36' is provided with an elongated piano-style hinge 40 which is secured to the lower extremity of body side wall 12 thus allowing door 36' to be swung between the open dashed line position and the closed full line position as illustrated in FIG. 3. It will also be noted that the door 36' is provided with an inturned lip 42 which is provided with a suitable gasket material 44 which prevents ingress of water and dust when the door is closed. In like fashion, the outer terminal edge portion of door 36' co-operates with a gasketing material 46 retained in a shallow groove in the lowermost portion of the running board 16'. The ends of door 36' are also provided with sealing lips or gaskets to keep out dust and moisture. Furthermore, in order to retain door 36' in the closed position, a plurality of turn locks 52 are provided along the lower edge of same, each being operable by way of a suitable key thereby to cause rotation of the lock finger 54 which engages with an upper edge portion of the fixed lower running board portion 16'. This lower running board portion 16' is of course attached to and forms a continuation of the previously described lower or bottom wall 20 of the compartment 18.

The upper door 34' is likewise secured along its upper edge by an elongated piano style hinge 60 to the body side wall 12. The marginal edges of this door are also provided with a suitable gasket material 61 thereby preventing ingress of dust and moisture into the compartment 18 when door 34' is closed. Again, as with the lower door 36' turn locks 62 are provided for selectively retaining door 34' in the closed position.

It might be noted that the floor 14 of the van may be provided with an optional door 64 illustrated in dashed lines in FIG. 3. If a door such as this is provided, access to the interior of compartment 18 may be had from the interior of the van. However, an interior access door 64 such as is shown may not be practical in many vans owing to the presence of the van interior facilities including passenger seats, toilet and kitchen facilities etc. Hence this option is only usable in a limited number of cases.

Figure 3A:
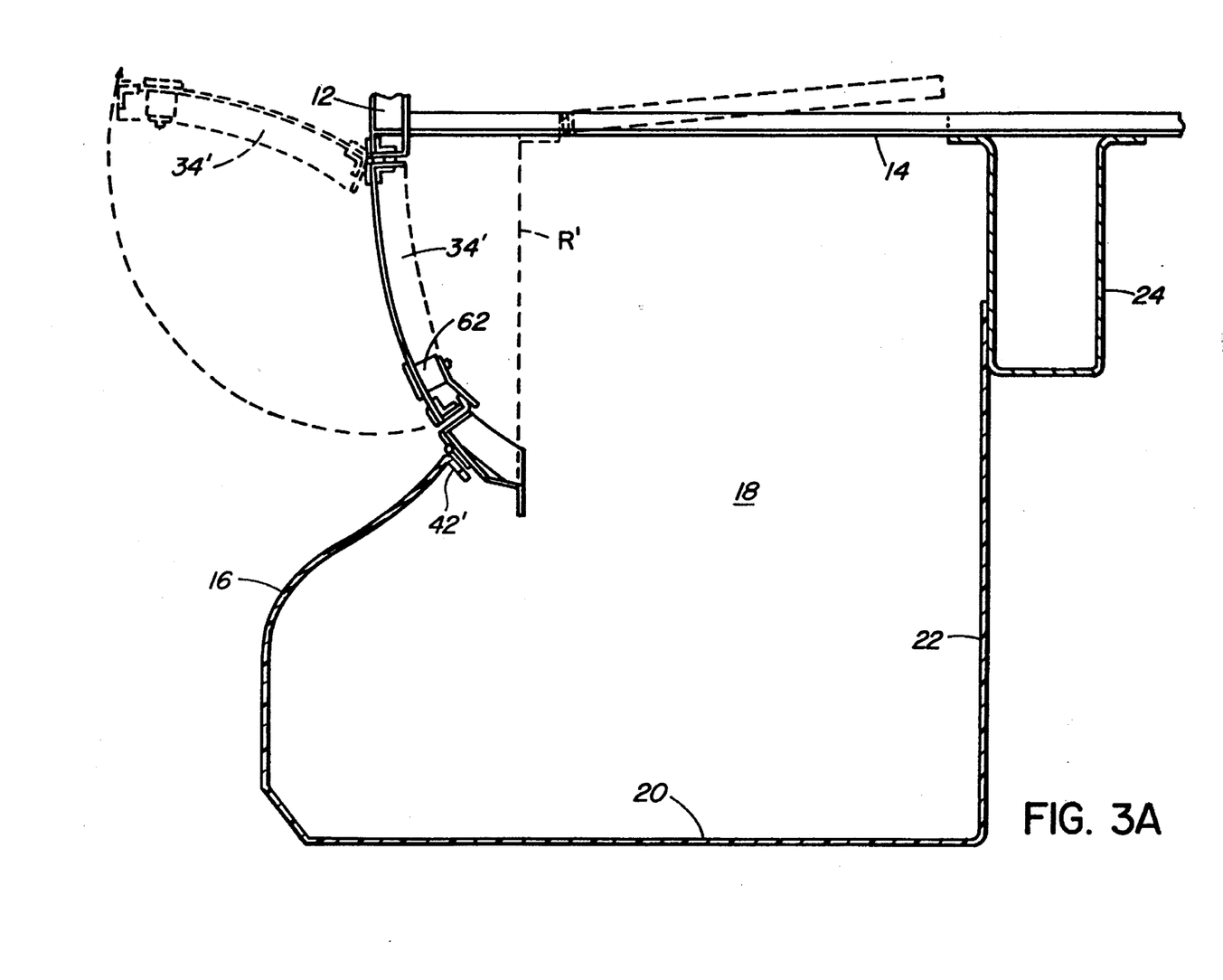
FIG. 3A is a transverse cross-section as in FIG. 3 but illustrating a modified access door arrangement.

Referring now to FIG. 3A there is shown a modification of the storage compartment previously described with reference to FIG. 3. The basic structure is essentially the same as described previously, the main difference being that the running board 16 is not provided with a door, such as door 36' described previously, but, rather, the running board appears as a unitary element, having the same curvature as described previously, and with its upper end having an inwardly turned flange portion 42' which is securely fixed in sealed relation to the lower edge of the body side wall 12. The running board 16 is of one piece composite material integrally formed with the compartment bottom wall 20 and back wall 22 plus the end walls (not shown). The remaining components are, with minor structural variations, essentially the same as described previously especially the door 34' and its locks 62 and associated structures.

The principal advantage of the embodiment illustrated in FIG. 3 over and above that shown in FIG. 3A is that larger items such as lawn chairs can be easily placed in the bottom half of the compartment 18 via the door 36' whereas it may be impossible to place such items into the compartment 18 through the upper door 34' only.

Figure 4:
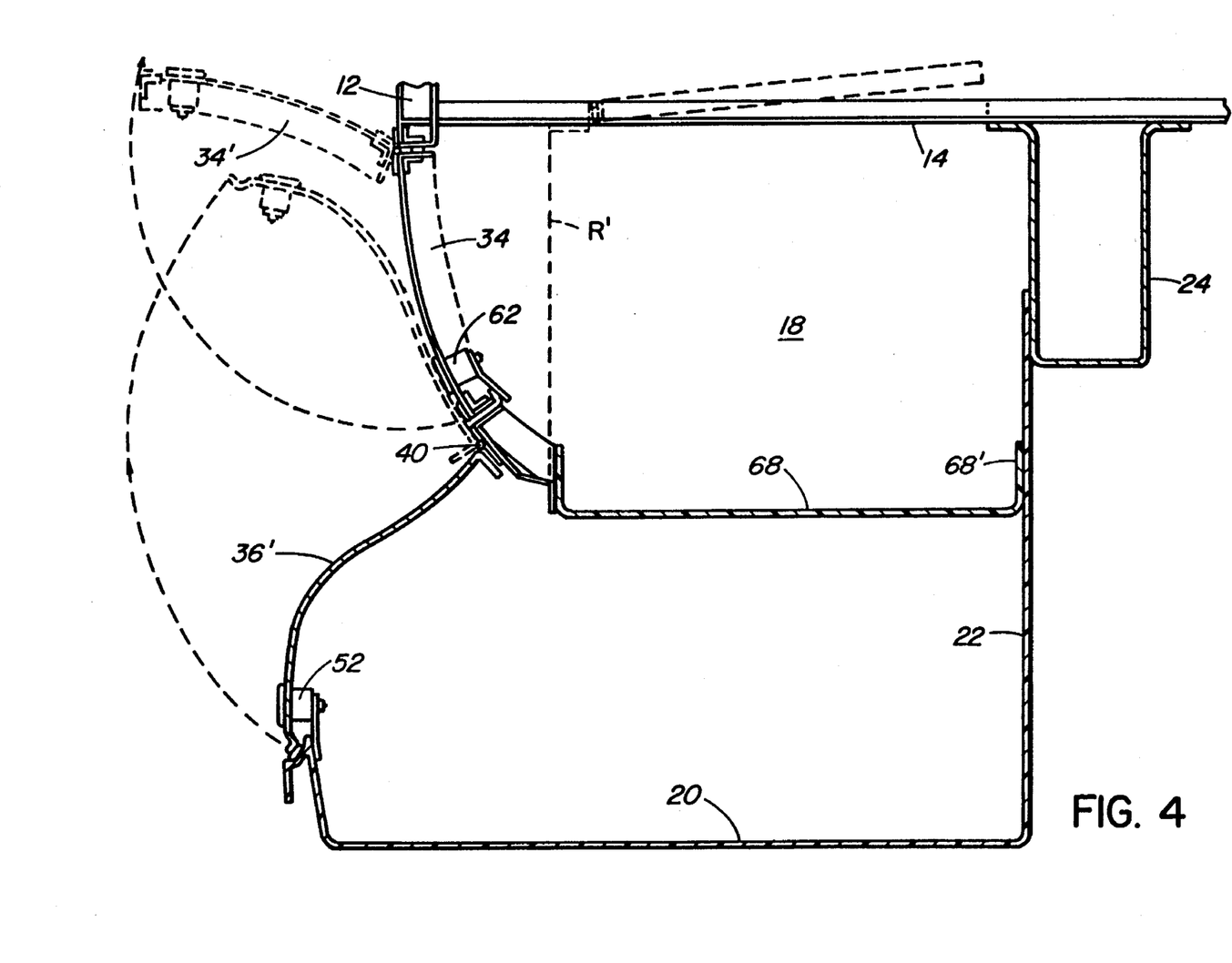
FIG. 4 is a transverse sectional view as in FIG. 3 but illustrating a modified form of storage compartment arrangement with a horizontal partition.

The embodiment illustrated in FIG. 4 is very similar in structure to the embodiment shown in FIG. 3, the only exception being that a horizontal partition 68 is interposed between the upper and lower halves of the compartment 18 effectively forming a shelf for better use of space. This partition 68 extends the full length of compartment 18 and is secured at its outer edge to a downwardly extended portion of the lower side wall 12 where the rocker panel converges with it while the rear edge of same is secured by way of a flange 68' securely bonded or otherwise fixed to the back wall 22 of the compartment. This horizontal partition 68 gives good access and is useful in many cases since smaller objects can be placed in the upper half of the compartment, which objects do not fall into and become mixed up and lost within larger objects stored in the lower half of the compartment as may be the case with the embodiments of FIGS. 3 and 3A.

Figure 5:
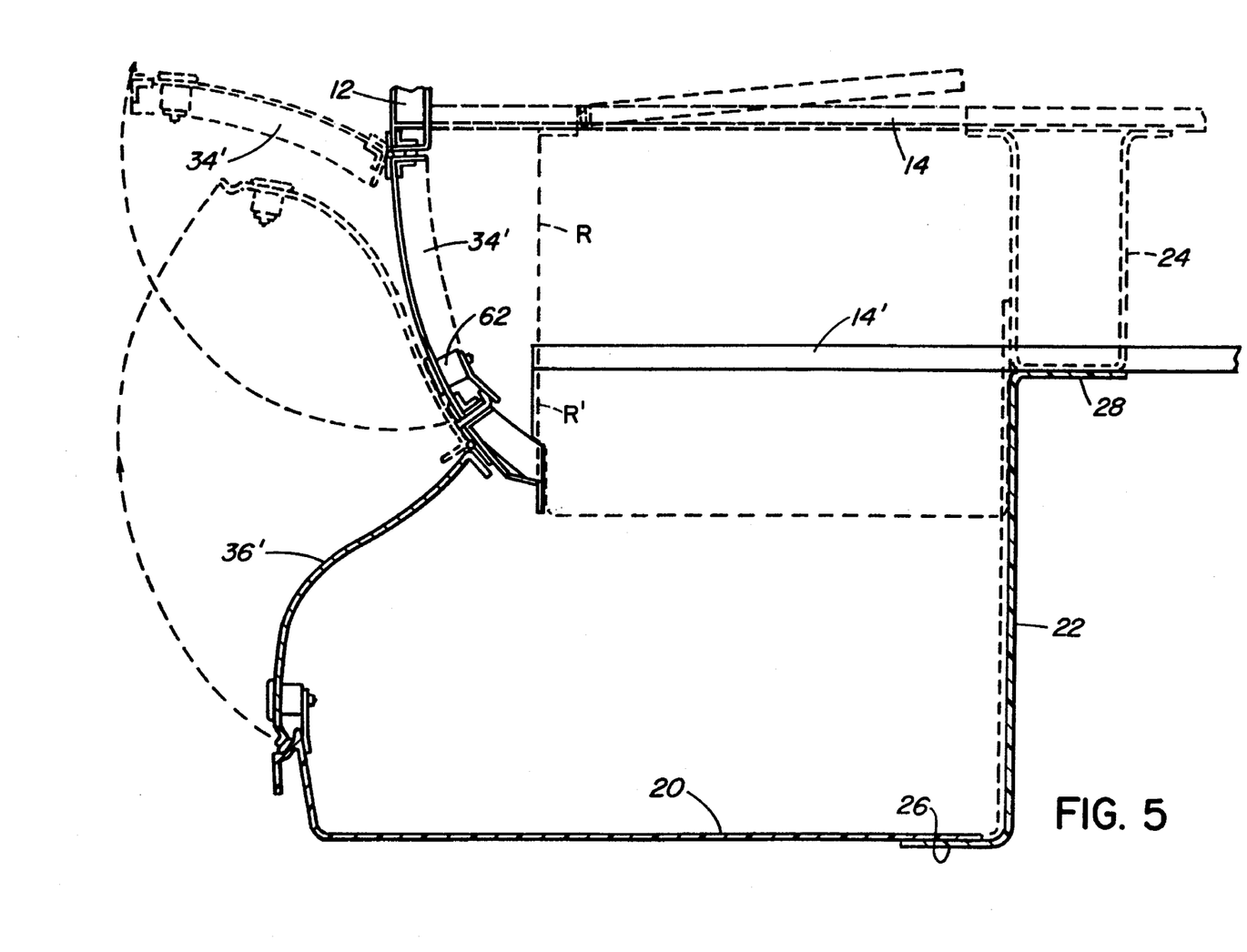
FIG. 5 is a transverse sectional view as in FIG. 3 but illustrating a modified form of a storage compartment arrangement.
Figure 6:
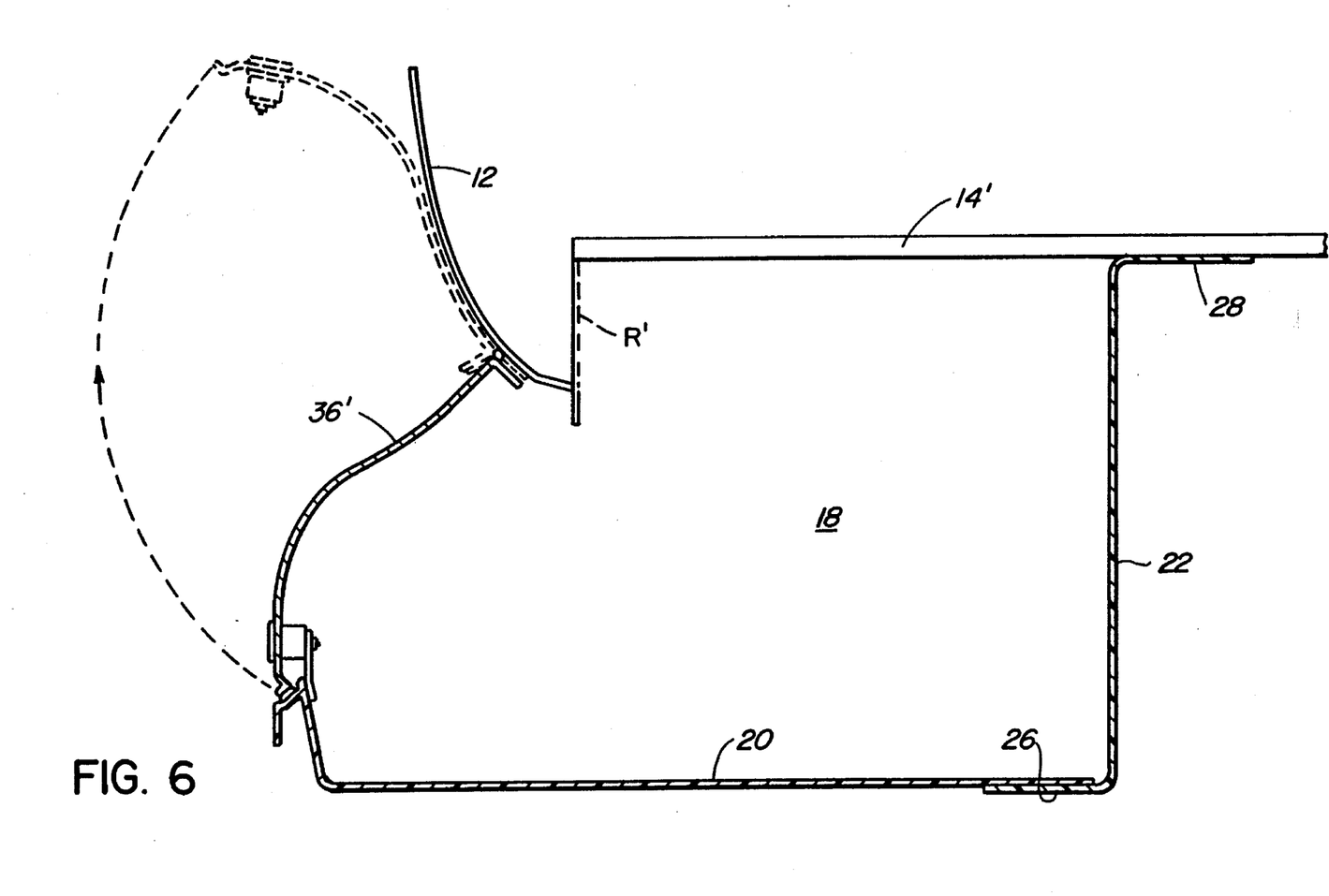
FIG. 6 is a transverse sectional view as before further illustrating the modification of the storage compartment arrangement of FIG. 5.

FIG. 5 is for the purpose of illustrating the change which takes place in the structure when a dropped floor arrangement is used. The previous standard floor arrangement 14 and chassis rail 24 are shown in dashed lines in FIG. 5. The so-called rocker-panel which is present when no compartment at all is provided is illustrated in dashed lines by the reference character R. When the floor is dropped downwardly to the lower level as is shown by reference character 14' the chassis rail 24 is eliminated, and in order to provide the necessary degree of structural strength, its place is taken by the sturdy steel back wall 22, the upper end of which is firmly welded to the floor 14 (and for a sufficient distance beyond each end of the removed section of the chassis rail) via flange 28, while the lower end is firmly attached to the bottom wall 20 via flange 26. Suitable compartment end walls are provided as before. The upper part of the rocker panel R is cut away or removed as illustrated by the dashed lines thereby providing additional space in the interior of the van with only that portion of the rocker panel remaining which extends between the outer edge of the dropped floor 14' and the lowermost edge of the side wall 12. A small portion of the rocker panel is designated by the reference R'. With this alteration, the upper door 34' becomes totally unnecessary and a short grill-vented refrigerator service door is put in its place. Hence, the end result of the modification is the version shown in FIG. 6 wherein the compartment 18 has but a single entrance doorway which is closed by the previously described door 36' with the compartment 18 being bounded on the top by the dropped floor 14' and by the remaining structures including bottom wall 20, back wall 22 and suitable front and rear walls welded thereto to provide a sealed compartment.

Figure 7:
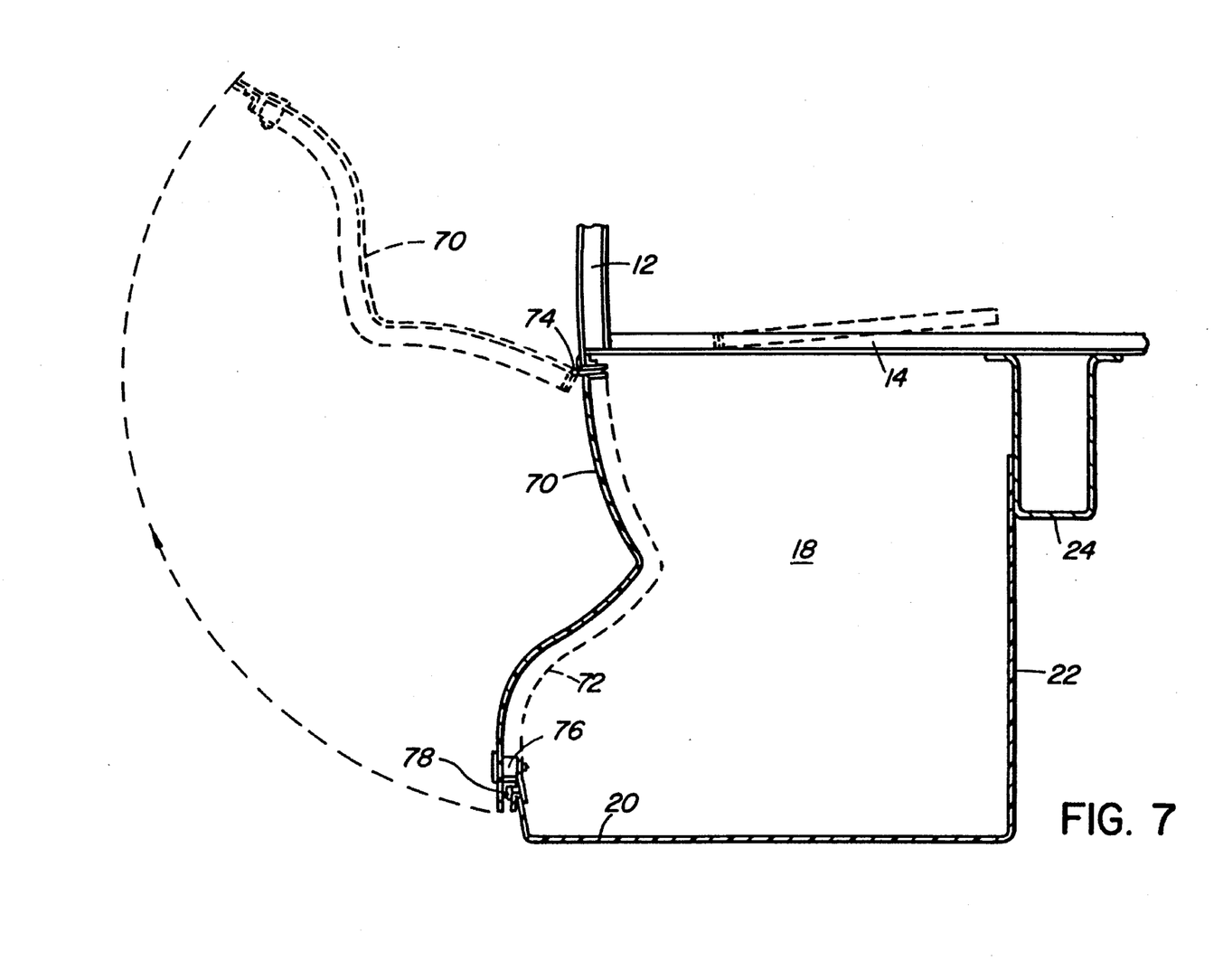
FIGS. 7 and 8 are transverse sectional views of two variations of the storage compartment employing a one-piece single door in place of the doors illustrated previously with FIG. 8 further showing a collapsible shelf arrangement.

The embodiment of FIG. 7 is similar to that of FIG. 3 except that the two doors 34' 36' of FIG. 3 have been replaced with a single door 70 which is preferably of a lightweight composite material (e.g. fibre-reinforced plastics) having suitable stiffening flanges 72 on both ends. A hinge 74 extends along the upper edge of door 70 to mount it for pivotal motion to the lower edge of body sidewall 12.

A plurality of turn locks 76 as described previously are provided along the lower free edge of door 70 to retain it in the closed position, and suitable gasketing material 78 surrounds the door to prevent ingress of water and dust when the door 70 is closed, all as described previously. Door 70 is contoured to match the contours of the lower body sidewall and running board portions and this contour will of course vary from one vehicle to another according to body style.

Figure 8:
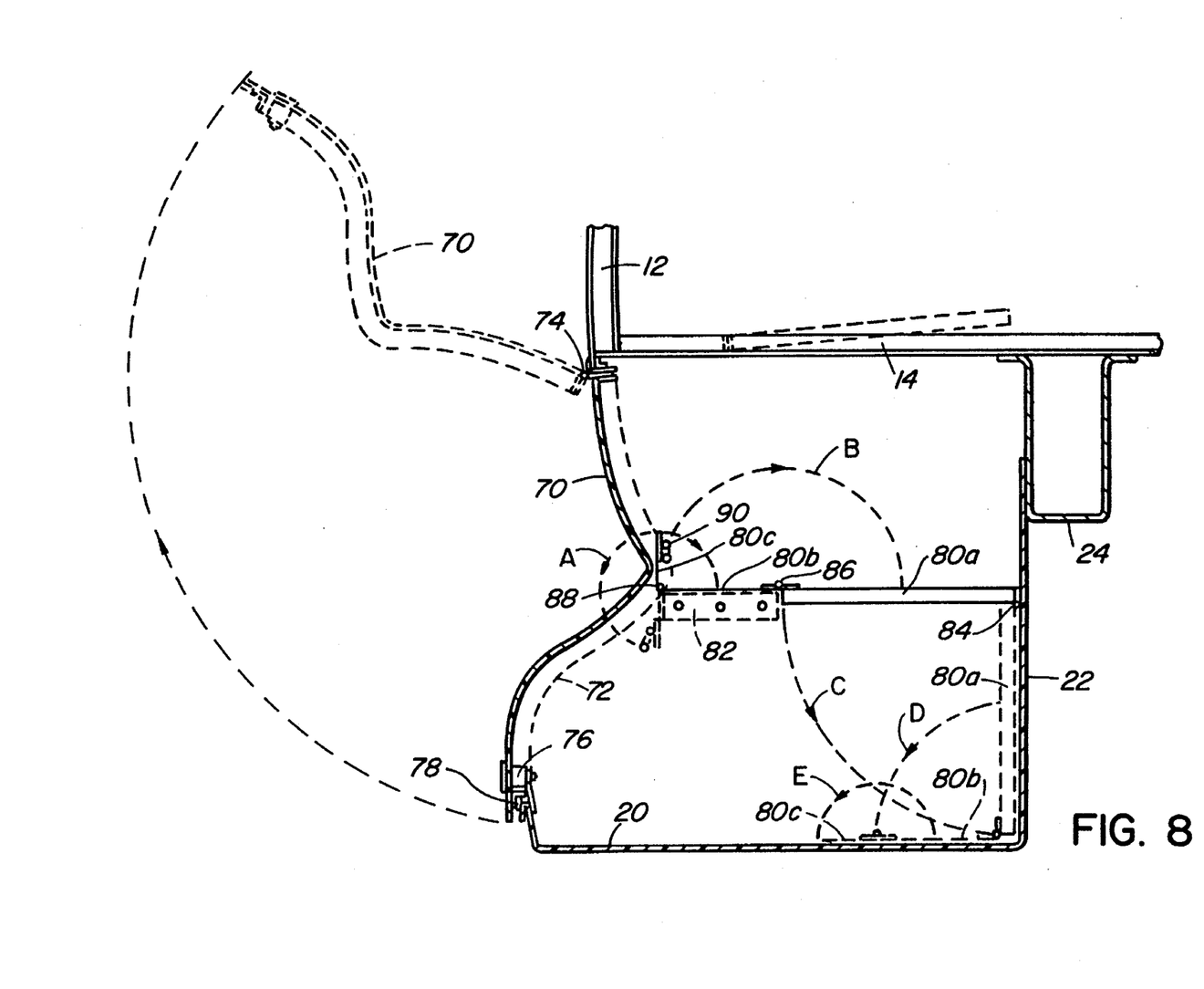

FIG. 8 is similar to FIG. 7 except that a shelf 80 is mounted in the compartment 18 and is movable from the full line horizontal position shown (where it is spaced above bottom wall 20 and extends from back wall 22 toward the doorway opening) to the collapsed position (in dashed lines) in close juxtaposition to the back wall 22 and bottom wall 20.

Shelf 80 extends the full length of the compartment and ledges 82 are fixed to the front and rear end walls of the compartment to support the shelf in the horizontal position. The shelf 80 comprises three longitudinally extending sections 80a, 80b and 80c and three-piano-style hinges. Hinge 84 secures the rear edge of shelf section 80a to the back wall 22. Hinge 86 secures front edge of shelf section 80a to intermediate shelf section 80b, the latter resting on ledges 82 when in the horizontal position. A frontal shelf section 80c is secured by hinge 88 to shelf section 80b. The opposite ends of shelf section 80c are provided with barrel bolts 90 which enter into apertures in the compartment end walls to secure the frontal section 80c at right angles to the rest of the shelf in either of the two positions shown in FIG. 8. In both cases the shelf section 80c provides strength and rigidity to the shelf structure and the barrel bolts 90 prevent unwanted collapse of the shelf. However when large items are to be stored in the compartment the barrel bolts 90 are retracted, section 80c is folded over onto section 80b in the direction of arrow A and section 80b is folded over onto section 80a in the direction of arrow B thus clearing the ledges 82 and allowing the shelf sections to be swung downwardly in the direction of arrow C toward the back wall 22 of the compartment. Following this, the shelf sections 80b and 80c are unfolded in the direction of arrows D and E respectively so that the two sections lie flush on the bottom wall 20 of the compartment thus allowing the full volume of the compartment to be used for storage of large items.

Although several modifications and variations have been described by way of example, those skilled in this art will understand that the invention is not to be limited to the embodiments which have been described above but that the invention is to extend to the full range of equivalencies as encompassed by the appended claims.

I claim:

1. A recreational vehicle including a van body having a side wall, a floor, and a running board at the lower extremity of the van body and extending downwardly below said side wall; a storage compartment extending inwardly from and being defined in part by said running board and having a bottom wall running the full length of the storage compartment and extending inwardly of the van body away from said running board at a level corresponding generally to the lower extremity of said running board and being joined to an upwardly extending compartment back wall, said bottom wall underlying the floor of the van body and spaced therefrom in the vertical direction, said back wall extending upwardly toward the floor of the van body and being fixed relative thereto, front end and rear end walls fully closing the opposed ends of said compartment to prevent ingress of dust and water thereinto and defining the fore and aft extremities of said compartment, at least one doorway opening leading into said compartment from the exterior of the recreational vehicle, and at least one door for selectively opening or closing said at least one doorway opening.

2. The recreational vehicle of claim 1 wherein said at least one doorway opening comprises an opening in said running board and extending lengthwise thereof.

3. The recreational vehicle of claim 1 including means providing a connection between the back wall and the floor.

4. The recreational vehicle of claim 1 wherein said floor comprises a dropped floor, said dropped floor extending outwardly toward the side wall of the van body and defining the upper extremity of said compartment.

5. The recreational vehicle of claim 1 wherein said floor extends outwardly toward the side wall of the van body such that said compartment extends from said bottom wall upwardly to said floor.

6. The recreational vehicle of claim 5 wherein said compartment is a unitary compartment extending from said bottom wall to the floor.

7. The recreational vehicle of claim 5 wherein said compartment is sub-divided by a partition extending from a lower extremity of the side wall over to said back wall generally parallel to the bottom wall, there being one said doorway opening leading into each sub-compartment thus defined, one said doorway being in said running board and the other being in a lower part of said side wall.

8. The recreational vehicle of claim 6 wherein a single said doorway opening leads into said unitary compartment, said single doorway opening being located in a lower part of said side wall and in said running board and extending lengthwise thereof.

9. The recreational vehicle of claim 6 where a pair of said doorway openings lead into said unitary compartment, one said doorway opening being located in a lower part of said side wall and the other said doorway opening being located in said running board, and a pivotally mounted pair of said doors, one for each of said doorway openings.

10. The recreational vehicle of claim 1 wherein said bottom wall is integrally formed with said back wall and said frontal and rear walls of a composite material.

11. The recreational vehicle of claim 10 wherein said bottom wall is integrally formed with said running board.

12. The recreational vehicle of claim 1 wherein said floor extends outwardly toward the side wall of the van body, and said compartment is a unitary compartment extending upwardly from said bottom wall to the floor, and a single said doorway opening leading into said unitary compartment.

13. The recreational vehicle of claim 1 wherein said van body floor extends outwardly to the side wall of the van body with said compartment extending from the bottom wall upwardly to said floor, and said compartment being void of any interior shelf to allow large objects to be placed in said compartment.

14. The recreational vehicle of claim 1 wherein said van body floor extends outwardly to the side wall of the van body with said compartment extending from the bottom wall upwardly to said floor, and a shelf within said compartment movable from a first horizontal position spaced from the bottom wall and extending from said back wall toward said doorway opening to a second collapsed position in close juxtaposition to said back wall and said bottom wall of the compartment.

15. The recreational vehicle of claim 14 wherein said shelf extends the full length of said compartment and ledges fixed to said front end and rear end walls of the compartment for supporting the shelf in the horizontal position, said shelf having longitudinal hinges and being foldable longitudinally for movement into the collapsed position.

16. The recreational vehicle of claim 15 wherein said shelf is in three parts with the frontal part adjacent the doorway opening being foldable upwardly or downwardly and being lockable in place at right angles to the rest of the shelf to provide rigidity to the frontal portion of the shelf.

* * * * *